(12) United States Patent
Lee

(10) Patent No.: US 10,247,407 B2
(45) Date of Patent: *Apr. 2, 2019

(54) WIRELESSLY-CHARGED SELF-LIT LAMP FINIAL

(71) Applicant: Jershyang Jerry Lee, Memphis, TN (US)

(72) Inventor: Jershyang Jerry Lee, Memphis, TN (US)

( * ) Notice: Subject to any disclaimer, the term of this patent is extended or adjusted under 35 U.S.C. 154(b) by 380 days.

This patent is subject to a terminal disclaimer.

(21) Appl. No.: 14/954,588

(22) Filed: Nov. 30, 2015

(65) Prior Publication Data

US 2017/0153020 A1    Jun. 1, 2017

(51) Int. Cl.

| F21S 9/03 | (2006.01) |
| F21V 17/12 | (2006.01) |
| H04R 1/02 | (2006.01) |
| F21V 33/00 | (2006.01) |
| H05B 37/02 | (2006.01) |
| F21S 6/00 | (2006.01) |
| F21V 23/04 | (2006.01) |
| G09F 23/00 | (2006.01) |
| F21W 121/00 | (2006.01) |
| F21Y 115/10 | (2016.01) |
| H05B 33/08 | (2006.01) |

(52) U.S. Cl.
CPC .......... *F21V 33/0056* (2013.01); *F21S 6/002* (2013.01); *F21S 9/03* (2013.01); *F21V 17/12* (2013.01); *F21V 23/0442* (2013.01); *G09F 23/00* (2013.01); *H04R 1/028* (2013.01); *H05B 37/0236* (2013.01); *F21W 2121/00* (2013.01); *F21Y 2115/10* (2016.08); *H05B 33/0863* (2013.01)

(58) Field of Classification Search
CPC ........ F21V 1/04; F21V 33/0056; F21V 23/00; F21V 17/12; H05B 37/0236; H04R 1/028; F21S 9/03
See application file for complete search history.

(56) References Cited

U.S. PATENT DOCUMENTS

| 4,365,237 | A | * | 12/1982 | Knight | ...................... G08B 7/06 200/61.03 |
| 5,601,355 | A | * | 2/1997 | Valentino | ........... A47G 33/0809 362/276 |
| 6,748,096 | B2 | * | 6/2004 | Chuang | .................. H04R 1/026 181/150 |
| 7,606,379 | B2 | * | 10/2009 | Ivey | ...................... F21V 7/0008 381/160 |
| 8,299,903 | B2 | * | 10/2012 | Haase | ................. F21V 33/0056 315/209 R |

(Continued)

*Primary Examiner* — Anh T Mai
*Assistant Examiner* — Arman B Fallahkhair
(74) *Attorney, Agent, or Firm* — Arjomand Law Group

(57) ABSTRACT

Briefly described, light generating, light emitting, or light and sound producing finials are disclosed for both utility and decorative purposes. These finials may be used for dim lighting of a room such as to replace night lamps or for romantic occasions, and can be changed based on seasonal traditions or holiday customs. In some embodiments the finials have their own batteries and LED lights and in other embodiments the finials' rechargeable batteries may be charged by the light emitting from the lamp on which the finials are mounted.

9 Claims, 3 Drawing Sheets

(56) References Cited

U.S. PATENT DOCUMENTS

| | | |
|---|---|---|
| 9,711,016 B2 * | 7/2017 | Spina .................... G08B 7/06 |
| 9,747,763 B1 * | 8/2017 | Scordato ................ G08B 7/06 |
| 2005/0161067 A1 * | 7/2005 | Hollins .................. A45B 23/00 135/16 |
| 2014/0369032 A1 * | 12/2014 | Lee ........................ F21S 9/02 362/183 |
| 2015/0049471 A1 * | 2/2015 | Lee ...................... F21V 33/0056 362/183 |

\* cited by examiner

WIRELESSLY-CHARGED SELF-LIT LAMP FINIAL

CROSS-REFERENCE(S) TO RELATED APPLICATION(S)

This application is a Continuation of the Utility patent application Ser. No. 13/967,307, entitled "Musical Self-Lit Lamp Finial," filed on Aug. 14, 2013, which itself is a Continuation-In-Part of the Utility patent application Ser. No. 13/916,299, entitled "Self-Lit Lamp Finial," filed on Jun. 12, 2013, and both of which are included herein by reference.

TECHNICAL FIELD

This application relates generally to lighting. More specifically, this application relates to light and/or sound generating ornamental finials for lamps.

BACKGROUND

A large number of lamps utilize a lamp shade support carried by the lamp and extending around the light bulb, referred to as "Harp." The upper end of a harp supports the lamp shade. The lamp shade is conventionally fastened to the upper end of the harp by a threaded member on the harp, called "Finial Stud," over which the lampshade washer is placed and held in position by a lamp "Finial." FIG. 1 shows different standard parts of a traditional table lamp. Finials are ornamental objects whose primary known use is to beautify table lamps. Finials include a decorative portion, which varies in design, and may include a bore having an internal thread for mating the finial with the finial stud of a table lamp. Though the threaded finial base usually serves a utilitarian purpose, finials are typically very decorative items, and are selected to complement the appearance of the lamps. The finial thus helps secure the lamp shade to the lamp base while at the same time beautifying the top of the lamp. Because of the decorating nature of finials for lamps, finials have become very desirable.

Traditional finials do not generate or emit their own light or sound. It is desirable to have light emitting and/or sound producing finials that can be used as night lamps and/or music players while decorating the table lamps.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
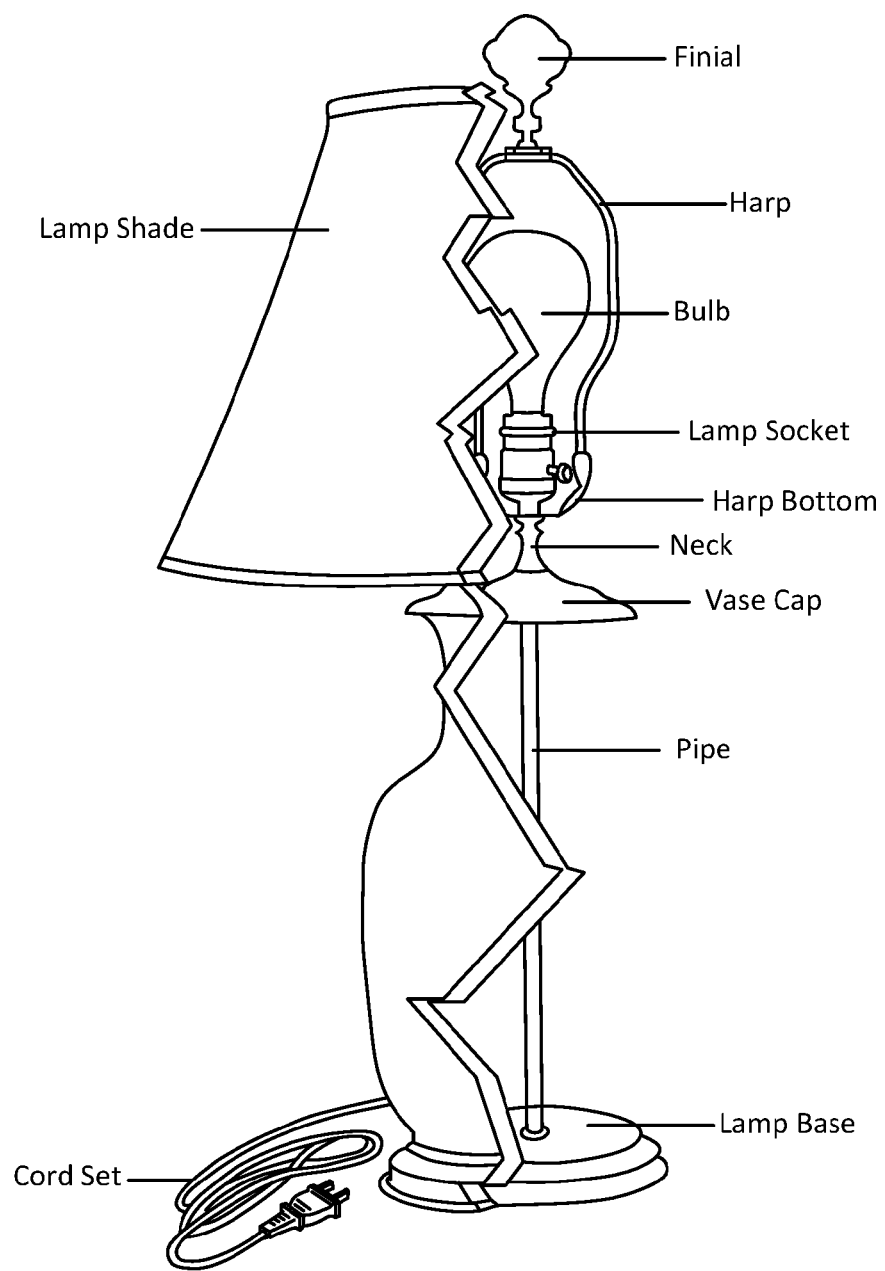
FIG. 1 shows different parts of a traditional table lamp.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references LED lighting, it will be appreciated that the disclosure may be applicable to other types of lights, such as incandescent lights, fluorescent lights, and the like.

Briefly described, self-lit and sound-producing finials are disclosed for utility and decorative purposes. These finials may be used for dim lighting of a room as a night lamp or for romantic occasions and be changed based on seasonal traditions or holiday customs. For example the finial can be in the shape of a Christmas Santa during Christmas Holidays or a turkey during Thanksgiving Holidays.

In various embodiments the finials may produce sounds such as music or song. The means for sound generation may vary in different embodiments. In some embodiments the finials may include a radio or a CD player. In other embodiments the sound may be generated by a programmable or a non-programmable electronic chip. In yet other embodiments the sound generating signals may be transmitted wirelessly from any device, such as a Smartphone, to the finials such as by RF (Radio Frequency, radio waves), IR (Infrared light) or technologies such as Bluetooth. For example the above mentioned Santa finial may include a programmable or a non-programmable electronic chip that produces Christmas songs or may include a radio which can be tuned to a station that broadcasts Christmas music. In yet other embodiments multiple finials on multiple lams may be employed to play music in "stereo." Some embodiments may include a voice recorder with playback capability.

In some other embodiments the light emitted from the finials may be choreographed for the sound produced by the finials or may be controlled by the sound producing signals or by the sound produced by the finials. Still in other embodiments the light emitted from the finials may be controlled by the ambient sound.

In some embodiments the finial has its own battery and LED light(s) and in other embodiments the finial rechargeable batteries may be charged by the light emitting from the lamp on which the finial is attached and/or ambient light, or are charged by other conventional methods and means. Various embodiments may use other electrical energy generating or storing components. In some embodiments the finials may be screwed to the finial stud and in some other embodiments the finials may merely be placed on a substantially horizontal plate screwed or affixed to the top of the harp, as will be described below.

In various embodiments the finials may be plugged into the wall outlets and have their own ON-OFF switches or be electrically connected to their host lamps. In yet other embodiments the finials may have multiple lights of various colors arranged to light up randomly or in a specific order. In some embodiments when a particular finial is used for a special occasion such as for Christmas, a matching lamp-cover of appropriate design and material may also be used to cover the lamp.

In preferred embodiments LEDs are the light generating source of the finials. Light emitting diodes (LEDs) are generally more energy efficient light sources than standard incandescent light bulbs and fluorescent lights.

Figure 2:
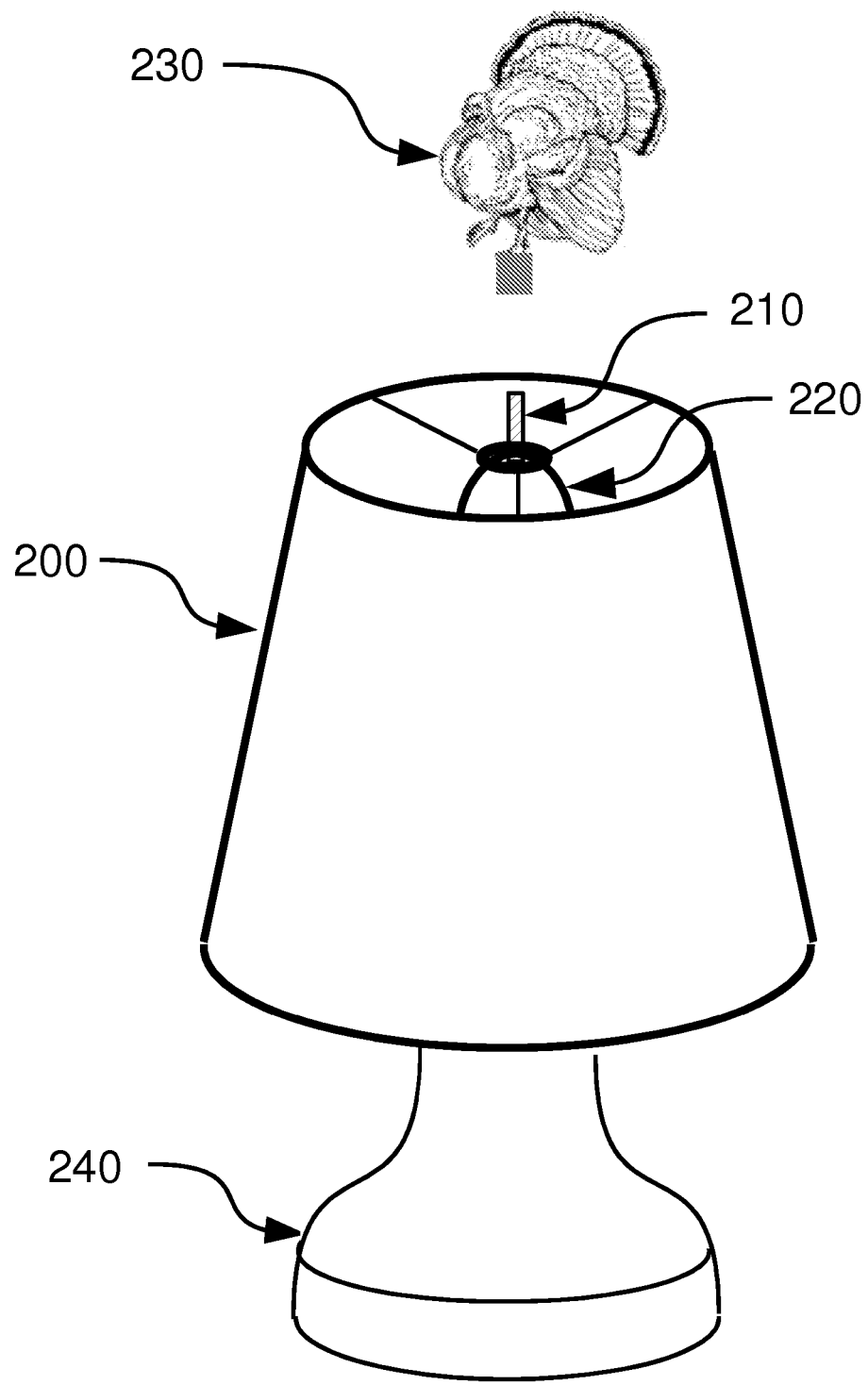
FIG. 2 shows an example screwable light and/or sound emitting finial.

FIG. 2 shows an example screwable light and/or sound emitting finial 230 in the shape of a turkey for Thanksgiving holidays. In this example embodiment finial 230 can be screwed to the finial stud 210, which is on top of harp 220, using a matching tapped-hole at the bottom of finial 230. Finial 230 may be screwed after lamp shade 200 is mounted on harp 220, as shown in FIG. 2. Finial 230 has a sound emitting component and/or LEDs or other kind of lights, along with any type of appropriate rechargeable or regular battery and an ON-OFF, light activated, or sound activated switch. The sound emitting component and/or the lights of finial 230 may also be controlled by an electrical/electronic circuit or a microprocessor. In some embodiments light-sensing switches that are focused on the light bulb of host lamp 240 may cause the sound emitting component and/or the light source of finial 230 to be dependent on lamp 240 and only operate whenever lamp 240 is ON, or stop operating whenever lamp 240 is OFF.

Figure 3:
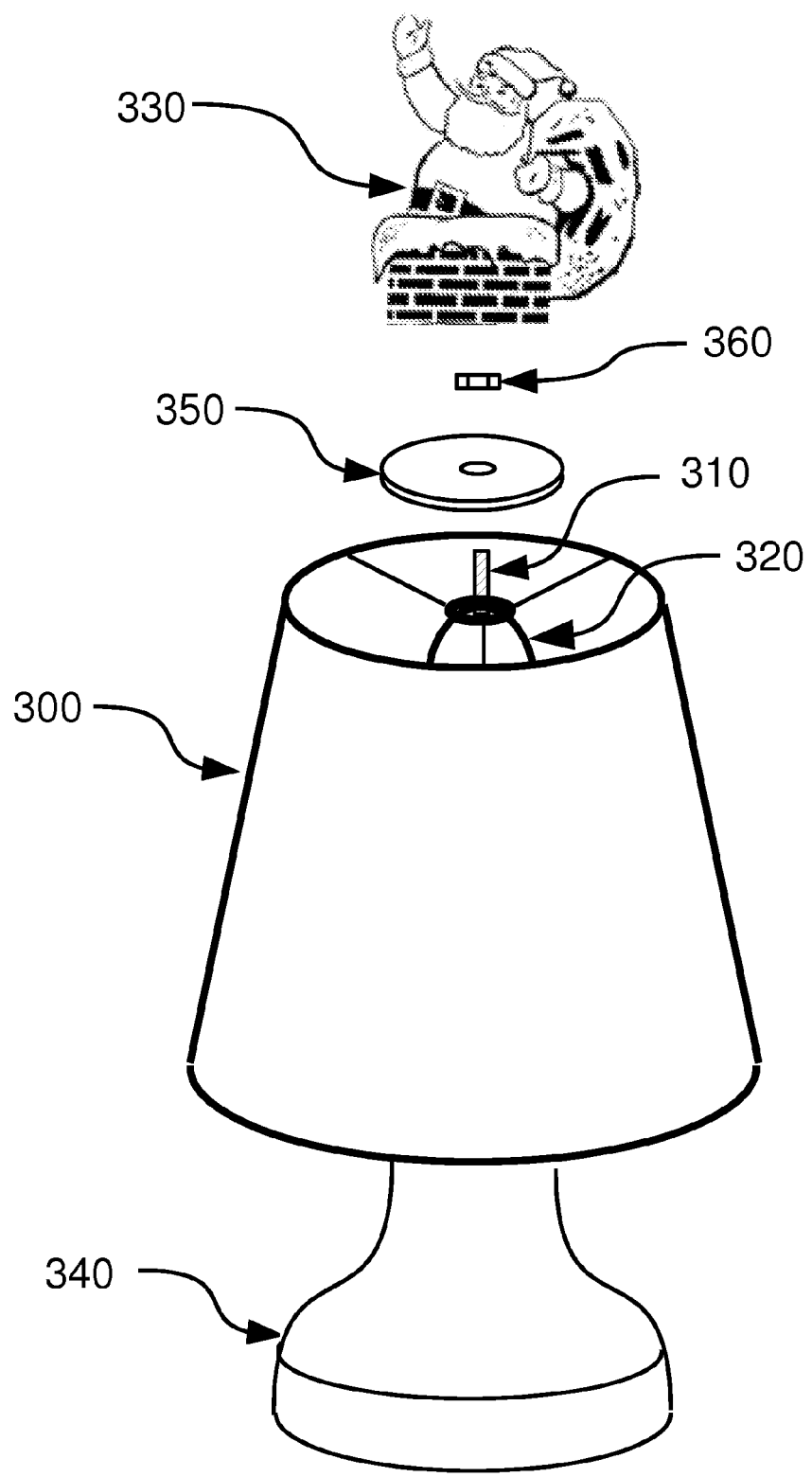
FIG. 3 shows an example non-screwable light and/or sound producing finial.

FIG. 3 show an example non-screwable light emitting and/or sound producing finial 330 in the shape of a Santa Claus for use during Christmas holidays. In this example after lamp shade 300 is mounted on harp 320, support plate 350 can be screwed on to the finial stud 310 via a tapped-hole in the support plate 350. Support plate 350 may merely have an untapped-hole and be kept on top of harp 320 by nut 360. Support plate 350 can be manufactured from any materials such as metals, plastic, resin, wood, and the like. After support plate 350 is fixed on top of harp 320, finial 330 may be simply placed on the support plate 350, as if placing it on a small table.

In some embodiments support plate 350 may be made of iron-based materials and finial 330 may have magnets mounted at its bottom, or vise versa, so that finial 330 can temporarily stick to support plate 350. In some embodiments finial 330 may temporarily stick to support plate 350 by Velcro or the like.

In some embodiments finial 330 has sound generating devices and LEDs or other kind of lights, along with any type of appropriate rechargeable or regular battery and an ON-OFF, light activated, or sound activated switch. The lights and/or sound generating devices of finial 330 may also be controlled by an electrical/electronic circuit or a microprocessor. In other embodiments light-sensing switches that are focused on the light bulb of lamp 340 may cause the light source and/or sound source of finial 330, to be dependent of host lamp 340 and only operate whenever lamp 340 is ON or stop operating whenever lamp 340 is OFF.

Embodiments which use support plate 350 make it easier for a user to frequently change finials 330. It should be noted that while it may be redundant, a screwable finial 230, shown in FIG. 2, may also be used with embodiments which use support plate 350. Support plate 350 can be large enough to accommodate multiple finials on it, such as the snowman family.

In some embodiments support plate 350 may be wireless charging pads, such as inductive charging pads. These kinds of charging pad support plates may be fed from any component of the host lamp circuit, such as the host lamp socket or directly from the wall outlet. In these embodiments finials 330 may be charged at the same time that they are lit. In various embodiments support plate 350 may physically mate with the finials to provide electricity to the finials.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A light producing finial system to be placed on a lamp, the finial system comprising: a support plate attached onto a harp of the lamp and an ornamental finial placed over and supported by the support plate; a wirelessly rechargeable electrical energy unit as a part of the ornamental finial, wherein the rechargeable electrical energy unit is wirelessly charged by at least one inductive charging pad provided with the support plate; a light generating component, as a part of the ornamental finial, wherein the light generating component is supported on the support plate and uses the wirelessly rechargeable electrical energy unit to generate light.

2. The finial system of claim 1, further including a sound generating component.

3. The finial system of claim 2, wherein the light generated by the light generating component is controlled by the sound generated by the sound generating component or controlled by ambient sounds or controlled by sound generating signals of the sound generating component.

4. The finial system of claim 1, wherein the light generating component is an LED light, an incandescent light, a fluorescent light, a programmable or a non-programmable electronic chip, or a combination thereof.

5. The finial system of claim 1, further comprising a manual ON-OFF switch.

6. The finial system of claim 1, further comprising a sound-activated ON-OFF switch.

7. The finial system of claim 1, wherein the light generating component is a night lamp.

8. The finial system of claim 1, further comprising an electrical circuit, electronic circuit, or a microprocessor to control the light generating component.

9. The finial system of claim 1, wherein the supporting plate is a charging pad.

* * * * *